United States Patent [19]

Tajima

[11] Patent Number: 4,657,828
[45] Date of Patent: Apr. 14, 1987

[54] FUEL CELL SYSTEM

[75] Inventor: Hiroyuki Tajima, Kanawaga, Japan

[73] Assignee: Fuji Electric Company Ltd., Kawasaki, Japan

[21] Appl. No.: 849,395

[22] Filed: Apr. 8, 1986

[30] Foreign Application Priority Data

Apr. 10, 1985 [JP] Japan .................................. 60-75579

[51] Int. Cl.$^4$ .............................................. H01M 8/06
[52] U.S. Cl. ........................................ 429/12; 429/17; 429/19; 429/20
[58] Field of Search ........................ 429/12, 13, 17, 19, 429/20, 26

[56] References Cited

U.S. PATENT DOCUMENTS

| | | | |
|---|---|---|---|
| 4,075,396 | 2/1978 | Grehier | 429/17 |
| 4,473,622 | 9/1984 | Chludzinski et al. | 429/19 X |
| 4,493,878 | 1/1985 | Horiba et al. | 429/12 |
| 4,555,452 | 11/1985 | Kahara et al. | 429/13 |

Primary Examiner—Anthony Skapars
Attorney, Agent, or Firm—Finnegan, Henderson, Farabow, Garrett & Dunner

[57] ABSTRACT

A fuel cell system is disclosed including a fuel cell having a fuel supply subsystem including a fuel chamber and an air or oxygen supply subsystem including an air or oxygen chamber, a burner, in which fuel derived from the fuel subsystem of the fuel cell is burned with air or oxygen, and a storage tank, in which combustion gas produced in the burner is stored as replacement gas so that the replacement gas is fed from the storage tank into the fuel subsystem of the fuel cell at the time of start and stop of operation of the fuel cell.

6 Claims, 2 Drawing Figures

FUEL CELL SYSTEM

BACKGROUND OF THE INVENTION

This invention relates to a fuel cell system, and more particularly to a replacement gas production and feed system for replacing the reacting gas of a fuel cell with inert gas at the time of start and stop of operation of the fuel cell.

It is well known that a fuel cell is made of a cell stack comprising plural single cells each composed of a pair of fuel electrode and oxidizing agent electrode between which an electrolyte is pinch-held. Fuel containing hydrogen and oxidizing agent such as air or oxygen are fed to the cell stack to generate electricity. Various fuel cells such as an alkaline type, a phosphoric acid type, a fused carbonate type and etc. are classified in accordance with the kinds of their electrolytes or operating temperatures. At the time of start and stop (including emergency stop) of operation of these fuel cells, the gases in fuel and oxidizing agent feed and discharge systems including the bodies of the fuel cells are generally replaced with inert gas such as nitrogen gas in order to secure safety. Especially for the fuel system of each of these fuel cells, the gas replacement is indispensable in controlling the operation of the fuel cell. When the fuel cell whose operation has been stopped is put in operation again, detonating gas is likely to be produced and dangerously explode if the fuel is fed into the fuel system having air or oxygen remaining therein. For that reason, the gas in the fuel system is replaced with the inert gas before the fuel is fed to resume the operation of the fuel cell. When the operation of the fuel cell is stopped, the pressure of the fuel gas is likely to decrease due to the internal discharge of the fuel cell, a temperature change of the like so that air enters into the fuel system to produce detonating gas if the fuel gas is left in the body of the fuel cell. In this case, similar gas replacement with the inert gas is performed to remove the fuel gas from the fuel system to secure safety. If the fuel leaks from the fuel system into the air or oxygen oxidizing agent feed system at the time of start and stop of operation of the fuel cell, detonating gas is likely to be produced and dangerously explode. For that reason, the gas replacement with the inert gas is performed for the oxidizing agent feed system as well as for the fuel system.

In a conventional fuel cell equipment, inert gas which is obtained not from its fuel and oxidizing agent feed systems but is obtained from outside is stored in a storage tank such as a pressure container in order to perform gas replacement as described above. The stored inert gas is fed from the storage tank to the reacting gas system of the fuel cell of the fuel cell equipment at the time of start and stop of operation of the fuel cell. When the stored quantity of the inert gas in the storage tank has decreased to a certain extent, the inert gas needs to be immediately supplemented to remain sufficient in quantity. For that purpose, detailed items of management such as the monitoring of the quantity of the inert gas remaining in the storage tank, the securing of inert gas stockpile and the purchase or acquisition of inert gas are always required to be done. As for a conventional fuel cell equipment used as a portable power source, an inert gas storage tank not only for inert gas in current use but also for inert gas in stockpile needs to be provided and conveyed together with the fuel cell equipment. Therefore, these conventional fuel cell equipments have a problem that it is very difficult to manage the remaining quantity monitoring, purchase or acquisition, storing and supplementing of inert gas.

SUMMARY OF THE INVENTION

The present invention was made in consideration of the above-mentioned problem.

Accordingly, it is an object of the present invention to provide a fuel cell system wherein inert gas is not supplied from the outside but the replacement gas is produced in the fuel cell system itself so as to instantly perform gas replacement at the time of start and stop of operation of the fuel cell of the fuel cell system so that it is made easy to manage replacing gas.

In order to achieve the object of the present invention, in the full cell equipment, there are provided a burner, in which fuel from the fuel system of the fuel cell is burned with air or oxygen, and a storage tank, in which combustion gas produced in the burner is stored as replacement gas, so that the replacement gas is fed from the storage tank into the reacting gas system of the fuel cell. The combustion gas is noninflammable gas whose main constituents are carbon dioxide and nitrogen.

According to the present invention, the replacing gas is produced in the fuel cell equipment itself, so that it is not required to purchase or acquire inert gas from the outside unlike in conventional fuel cell equipments. Therefore, the management of the replacement gas is greatly simplified. As for a fuel cell equipment provided as a portable power source according to the present invention, only fuel needs to be managed for storage and conveyance, and no stockpile of replacement gas needs to be provided and conveyed together with the fuel cell equipment.

It will be understood from the above description that the present invention brings high advantages.

DETAILED DESCRIPTION OF THE PREFERRED EMBODIMENTS

Figure 1:
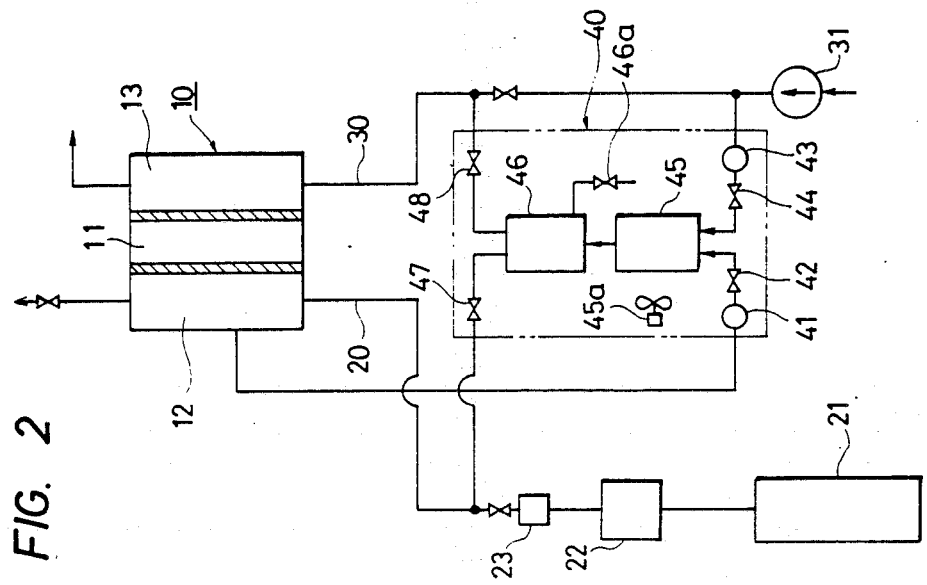
FIG. 1 is a systematic diagram showing a fuel cell equipment according to an embodiment of the present invention.

FIG. 1 shows a systematic diagram of a fuel cell equipment, which is an embodiment of the present invention and is intended for a fuel cell of phosphoric acid type. In FIG. 1, a fuel cell body 10 comprises an electrolyte chamber 11, a fuel chamber 12 and an air chamber 13 in such a manner that the fuel chamber 12 and the air chamber 13 sandwich the electrodes on both sides of the electrolyte chamber 11, respectively. A fuel system 20 and an air system 30 are connected to the fuel chamber 12 and the air chamber 13, respectively. The fuel system 20 comprises a fuel storage tank 21 in which fuel such as liquefied natural gas (LNG), liquefied petroleum gas (LPG), naphtha and methanol or the like is stored, a water steam reformer 22 and a carbon monoxide denaturalizer 23. The fuel is converted into hydrogen-rich fuel gas through the water steam reformer 22 and the carbon monoxide denaturalizer 23 and then fed to the fuel chamber 12 of the fuel cell body 10. The air system 30 includes an air blower 31. Air is fed to the air chamber 13 of the fuel cell body 10 through the air system 30. The above-described constitution is the basic constitution of a conventional fuel cell equipment.

According to the present invention, as shown in FIG. 1, a replacement gas production and feed system 40 is added to the conventional fuel cell equipment. The replacement gas production and feed system 40 comprises a burner 45, in which liquid fuel derived from the fuel storage tank 21 through a pressure and flow rate regulator 41 and a fuel valve 42 is burned with air fed form the air blower 31 through a pressure and flow rate regulator 43 and an air valve 44, a combustion gas tank 46 connected to the downstream side of the burner 45 and combustion gas feed valves 47 and 48 provided in combustion gas feed pipes which connect the combustion gas storage tank 46 to the fuel system 20 and air system 30, respectively. The burner 45 is a contact-type burner in which a spherical catalyst made of an alumina carrier and containing 0.2% by weight of platinum is packed. If the burner 45 is to perform the contact burning of liquefied natural gas (LNG) as fuel, the catalyst is preheated to about 550° C. by a heater because the contact burning is performed at 200° C. or more and the complete combustion of the fuel is performed at about 550° C. It is preferable that the burner 45 is cooled by an air fan 45a to control the burning reaction temperature of the burner to a prescribed level to prevent the burner from being overheated due to the contact burning reaction therein. The combustion gas storage tank 46 is furnished with a drain valve 46a for draining water condensed in cooling the combustion gas produced in the burner 45.

The operation of the replacement gas production and feed system 40 in the use of liquefied natural gas (LNG) as the fuel will be described hereinafter. After the flow rate of the fuel from the fuel storage tank 21 and the flow rate of the air from the air blower 31 are regulated so that the ratio of the fuel to the air is set at 1, the fuel and the air are fed to the burner 45 so that the complete combustion of the fuel with the air is performed. The combustion gas produced in the burner 45 is sent out to the combustion gas storage tank 46 and stored therein. Since the main constituent of the liquefied natural gas (LNG) as the fuel is mathane, the ratio of the carbon dioxide, nitrogen and water steam of the combustion gas is 1:8:2. The combustion gas is cooled in the storage tank 46 so that the condensed water is separated from the combustion gas and drained through the drain valve 46a. The stored gas in the tank 46 is thus changed into noninflammable gas whose ratio of carbon dioxide and nitrogen is 1:8 and which is almost equivalent to inert gas used as replacing gas in conventional fuel cell equipments. The combustion gas stored in the tank 46 is fed as replacement gas to the fuel system 20 and air system 30 of the fuel cell through the feed valves 47 and 48, respectively, at the time of start and stop of operation of the fuel cell so as to carry out prescribed gas replacement.

Though liquefied natural gas (LNG) is used as the fuel in the above-described embodiment and the contact burning reaction of the liquefied natural gas (LNG) with the air is performed to produce the combustion gas as replacement gas, such different kinds of fuel as liquefied propane gas (LPG) or the like may be used and subjected to contact burning by a noble metal catalyst. If fuel reformed from hydrocarbon and containing hydrogen or carbon monoxide is used, the contact burning can be performed on the fuel at a lower temperature.

Though the ratio of the fuel to the air for the burner 45 is regulated to be 1, the ratio does not necessarily need to be 1, but only needs to be regulated to such a range that the constituents of the combustion gas produced in the contact burning do not constitute detonating gas.

Figure 2:
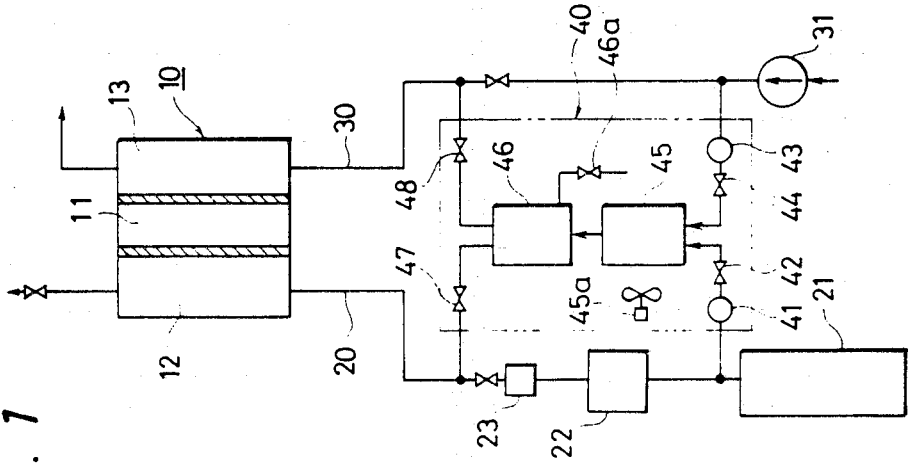
FIG. 2 is a systematic diagram showing a fuel cell equipment according to a second embodiment of the present invention.

FIG. 2 shows a second embodiment of the present invention. Elements corresponding functionally to those in the first embodiment are designated by like reference numerals or characters.

The fuel cell body 10 is fed with hydrogen-rich fuel gas produced by reforming liquefied natural gas (LNG), liquefied propane (LPG) gas, methanol, naphtha or the like by water steam. 70 to 80% of the hydrogen of the fuel gas is consumed in the electricity generating reaction in the fuel cell body 10. Gas rich in carbon dioxide is discharged as waste gas from the fuel cell body. Therefore, according to the second embodiment of the present invention, the waste gas is derived from the fuel system and mixed with air and the mixture is subjected to contact burning so as to produce combustion gas to be used as replacement gas.

Since liquid fuel can be introduced under higher pressure into the burner than gas fuel, less energy is needed to introduce the liquid fuel than the gas fuel. Therefore, the use of the liquid fuel is more advantageous than that of the gas fuel.

It is obvious that pure oxygen or liquefied oxygen can be fed for the contact burning, instead of air.

What is claimed is:

1. A fuel cell system comprising:
a fuel cell, said fuel cell having a fuel supply subsystem including a fuel chamber and an air or oxygen supply subsystem including an air or oxygen chamber;
burning means for burning, with air or oxygen, a fuel derived from said fuel subsystem; and
storage means for storing combustion gas produced in said burning means as a replacement gas, wherein the combustion gas is fed as replacement gas from said storage means to said fuel chamber and said air or oxygen chamber at the time of start and stop of operation of said fuel cell.

2. A fuel cell system according to claim 1, wherein said burner is of the contact type causing contact burning reaction under a catalytic action.

3. A fuel cell system according to claim 1, wherein the fuel for producing the replacement gas comprises fuel derived from fuel source of said fuel supply subsystem.

4. A fuel cell system according to claim 1, wherein the fuel for producing the replacing gas comprises waste gas discharged from said fuel chamber of said fuel cell.

5. A fuel system according to claim 1, wherein a ratio of the fuel to the air or oxygen for said burning means is regulated to such a range that the constituents of the combustion gas produced in said burning means do not constitute detonating gas.

6. A fuel system according to claim 5, wherein the ratio of the fuel to the air or oxygen for said burning means is regulated to be 1.

* * * * *